Patented Mar. 2, 1948

2,437,087

UNITED STATES PATENT OFFICE 2,437,087

CONDENSATION PRODUCTS OF QUINONES WITH ACTIVE ETHYLENE COMPOUNDS

Marshall De Motte Gates, Jr., Arlington, Va.

No Drawing. Application December 22, 1944, Serial No. 569,423

2 Claims. (Cl. 260—396)

This invention relates to the preparation of new condensation products of quinones with unsymmetrically substituted ethylenes, and to the process for preparing them.

In the article by Wizinger & Coenen, J. Prakt. Chem., vol. 153, pages 127 et seq. (1939), the condensation of nitrogen-substituted halogen benzenes with unsymmetrically substituted ethylenes is disclosed. In the type of reaction described by these authors, the condensation with the ethylene group takes place with the elimination of a halogen acid, and the color-forming groups result solely from the new ethylenic linkage and its relationship with the rest of the molecule.

I have found that a new series of highly colored compounds may be produced by condensing ortho- or para-quinones with unsymmetrically substituted ethylenes of the general formula:

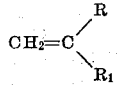

wherein R and R' are benzene radicals which carry o-p directing groups, or where R and R', together with the connecting carbon atom, form part of a heterocyclic ring in which the carbon atom stands in the alpha or gamma position relative to the hetero-atom. The o-p directing group or groups may constitute part of the heterocyclic ring which may also join the benzene rings, or each benzene ring may carry an individual o-p directing group. The o-p directing groups are those more particularly referred to by Wizinger & Coenen in the article above-mentioned as "positivating aurochromes" such as the alkyl groups, CH₃O—, HO—, H₂N—, (CH₃)₂N—, C₆H₅NH—, etc., including such group when forming part of the heterocyclic ring, as more particularly illustrated by Wizinger & Coenen on page 131 of their article, which class of radicals has been recognized as activating the molecule so that condensation through the ethylenic group may be effected with certain types of compounds.

The compounds of this invention are believed to have the general formula:

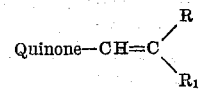

in which both R and R' have the same significance as in the formula given above, and the quinone is of the benzene or naphthalene series and is attached to the ethylene radical in a position ortho to one of the ketonic carbon atoms of the quinone. These compounds are highly colored when in the form of the free base in which the color characteristics of the compound are apparently enhanced due to the quinoid structure of the condensing molecule. The condensation of the quinones with the unsymmetrically substituted ethylenes produces compounds with color nuclei capable of being used in dyeing processes and in the preparation of other dyes.

The quinones which may be employed are the ortho- or para-quinones of both the benzene and naphthalene series which may carry non-reactive substituents such as the hydroxyl or low molecular alkyl groups. In each case at least one set of adjoining ortho and meta positions relative to at least one ketonic carbon atom in the quinone must be free from substituents. In the case of the naphthoquinones, the substituents may be on the benzene radical which does not contain the ketonic carbon atoms. With the benzoquinones where no substituent is present, it is possible that condensation may take place on both sides of the quinone molecule.

The preparation of these new colored compounds may be carried out by heating an excess (preferably two molar equivalents) of the quinone with the ethylene compound (one molecular equivalent) in a non-reactive organic solvent. The solvent is preferably one in which the quinone is soluble, such as dioxane and acetone, so that the excess quinone can be readily removed from the resulting color compound. In the reaction, the excess quinone appears to operate as an oxidizing agent to give the condensation product in the form of the quinone, while the excess starting quinone is reduced to the hydroquinone.

The following examples are given to illustrate the invention. The melting points of the products obtained during the reaction as given are corrected except where otherwise specifically designated.

Example 1

A solution of 1.16 g. of alpha-naphthoquinone in 15 ml. of warm dioxane was added to 0.973 g. of 1,1-bis(p-dimethylaminophenyl)-ethylene dissolved in 15 ml. of the same solvent. A dark purple-red color appeared immediately. The mixture, protected from light, was heated to 70° C. for 23 hours in a flask closed with a rubber stopper, then allowed to cool for 4 hours. The beautiful blue-black needles which had separated were collected and washed with cold dioxane; yield 906 mg. (59%), of directly pure material, melting point 270.5°–272° C. The condensation product, which is 2-(1',4'-naphthoquinonyl-2')-

1,1 - bis-(p-dimethylaminophenyl)-ethylene and which has the formula:

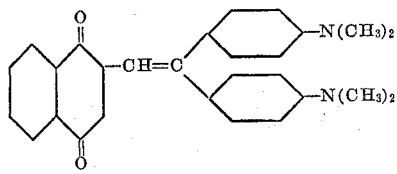

is very sparingly soluble in alcohol, acetone and glacial acetic acid, moderately soluble in boiling dioxane with a deep purple-blue color. Its solution in concentrated sulfuric acid is deep red-brown in color. It dissolves in 3 N-hydrochloric acid to give a bright yellow solution, which on strong dilution with water gives first a greenish-yellow solution which then deposits the original material as a blue-black solid. A small portion was recrystallized twice from dioxane and dried at 78° C. and 0.1 mm. for analysis, melting point 272°–273.5° C. Analysis of the product showed the following: C, 79.45; H, 6.04; N, 6.72. Calculated for this product: C, 79.59; H, 6.20, N, 6.63.

In the above reaction, acetone may be substituted for the dioxane employed as the solvent. While this same reaction takes place readily with benzene as the solvent, it is difficult to obtain the desired product in a pure form since the impurities such as the alpha-naphthohydroquinone are sparingly soluble in the solvent and therefore contaminate the resulting product, and special purification methods must therefore be employed.

*Example 2*

The condensation product of Example 1 was reductively acetylated as follows: 502 mg. of 2-(1',4'-naphthoquinonyl-2')-1,1-bis-(p-dimethylaminophenyl)-ethylene dissolved in 10 ml. of hot pyridine was treated with 0.4 g. of zinc dust and 5 ml. of acetic anhydride. On addition of the acetic anhydride the deep purple-black color changed to a light yellow-tan marked by an intense greenish fluorescence.

After standing ten minutes, the zinc was filtered off and washed with ether, the filtrate diluted with ether, washed three times with water, then three times with dilute alkali, once with water, finally with brine, and filtered through anhydrous sodium sulfate. The yellow solution thus obtained had the same intense greenish fluorescence observed in the reaction mixture. After removal of the ether the residual deep brown viscous oil on triturating under hexane solidified to a brown-yellow solid, 628 mg. (605 theoretical) melting point 201°–211° C. In contrast to the starting quinone, this leucodiacetate crystallizes only with difficulty and purification was costly. The crude material (550 mg.), dissolved in the minimal quantity of hot dioxane was treated with a little hot water and allowed to cool. The first crop separated as a glassy crust, 205 mg., melting point 227°–230° C., with decomposition. Dilution of the filtrate with alcohol gave 97 mg., melting point 225°–226° C., with decomposition. These two crops were combined, dissolved in the minimal quantity of hot dioxane, diluted with an equal volume of hot alcohol and allowed to crystallize. The solution still showed an intense fluorescence. Small compact prisms adhering to the walls of the flask were obtained, 181 mg., melting point 228°–230° C., with decomposition. Two further crystallizations gave small yellow-tan prisms, melting point 230°–231° C., with decomposition. The melting point depends somewhat on the rate of heating. For analysis the material was dried for three hours at 78° C. and 0.1 mm. This product is the 2-(1',4'-diacetoxynaphthyl-2')-1,1-bis-(p-dimethylaminophenyl)-ethylene. It is sparingly soluble in alcohol, fairly soluble in acetone, and readily soluble in dioxane. Its solution in concentrated sulfuric acid is orange-red appearing canary-yellow to greenish-yellow in thin layers. It is soluble with complete loss of color in 3 N hydrochloric acid. Neutralization with dilute alkali gives a bright yellow precipitate of the unchanged leucodiacetate. Analysis showed: C, 75.20; H, 6.23. Calculated for this product: C, 75.56; H, 6.34.

*Example 3*

To 2.32 g. of beta-naphthoquinone in 30 mol. of warm methanol was added a solution of 1.95 g. of 1,1-bis-(p-dimethylaminophenyl)-ethylene in 50 ml. of warm methanol. An immediate deep blue-green color was produced which on heating to boiling rapidly gave way to a deep indigo blue. At the end of a few minutes the product began to separate as fine violet-black prismatic blades. The reaction mixture was allowed to stand overnight at room temperature, then the product was collected and washed with cold methanol until the filtrate was clear blue with no reddish-purple tinge. After air drying, 2.58 g. (83.7%) of material, melting point 194°–196° C., was obtained. It is rather sparingly soluble in methanol, fairly soluble in hot acetone and dioxane to give deep indigo blue solutions. Its solution in concentrated sulfuric acid is a deep ultramarine color. It dissolves in 3 N hydrochloric acid with a brown color. Dilution has no effect on this color, nor does it cause precipitation of the free base. A small sample was recrystallized twice from acetone-methanol, then dried at 100° C. and 10⁻⁴ mm. for one hour, melting point 199°–201° C., with gas evolution. This product, which is the 2-(1',2'-naphthoquinonyl-4')-1,1-bis-(p-dimethylaminophenyl)-ethylene, has the formula:

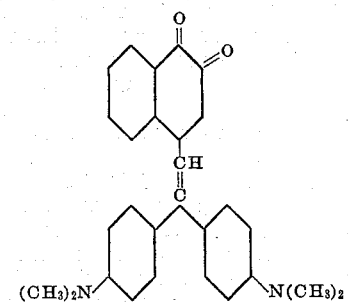

This product on analysis showed: C, 79.40; H, 6.10; N, 6.81. Calculated for the above product: C, 79.59; H, 6.20; N, 6.63.

*Example 4*

To 630 mg. of the condensation product of Example 3 suspended in 5 ml. of acetic anhydride, was added 0.4 g. of zinc dust, then 10 ml. of pyridine. The deep blue suspension rapidly gave way to a greenish-yellow fluorescent solution. After standing for fifteen minutes, the zinc dust was filtered off, washed with ether, then twice with hot pyridine, then again with ether. The light yellow filtrate was diluted with water, the yellow ethereal layer was separated, washed three times with water and then extracted twice with dilute hydrochloric acid. The nearly colorless acid layer on neutralization with solid sodium bicarbonate yielded a canary-yellow solid. A third acid extract gave no precipitate on neutralization. After air drying, this precipitate amounted to 738 mg. (97.4%), melting point 95°–102° C. The material is sparingly soluble in cold methanol, readily soluble in benzene and chloroform. Its solution in hot acetone on cooling deposits the material as beautiful canary yellow needles, melting point 92.5°–94.5° C., but the yield on crystallization is poor. Successive crops afforded a total of 541 mg. (71.5%), melting point 93°–94° C. To avoid prohibitive crystallization losses, a mixture of acetone-hexane was used for subsequent purification of an analytical sample. The material is obtained in partially solvated form from mixtures containing acetone. Thus, a sample of the above material after two further crystallizations melted at 96°–96.8° C., but after drying one hour at 78° C. and $10^{-4}$ mm., the melting point was raised to 105.6°–106.8° C. It is soluble in concentrated sulfuric acid with a deep orange-red color which changes to red-purple on standing. Its solution in 3 N hydrochloric acid is colorless. Neutralization precipitates the bright yellow solid. This product on analysis showed: C, 75.59; H, 6.64. Calculated for the product: C, 75.56; H, 6.34.

*Example 5*

To further identify the product of Example 3, the azine was formed as follows: A solution of 619 mg. of 2-(1',2'-naphthoquinonyl-4')-1,1-bis-(p-dimethylaminophenyl)-ethylene and 168 mg. of o-phenylenediamine in 10 ml. of benzene was treated with 1 ml. of glacial acetic acid. On addition of the acetic acid and slight warming, the color changed from the original blue to a deep red-brown. The mixture was heated under reflux for ten minutes, then diluted with an equal volume of hexane and set aside. Collection of the crystallizate afforded 645 mg. (89%) of deep red prismatic needles, melting point 244°–246° C., softening from 241° C. Three further crystallizations of a small sample from benzene-hexane gave ruby-red blades, melting point 246°–247.5° C. The azine is rather sparingly soluble in alcohol and acetone, readily soluble in hot acetic acid, hot dioxane or hot benzene. Its solution in concentrated sulfuric acid is a deep black-purple. It dissolves in 3 N hydrochloric acid with an orange color, and does not precipitate even on strong dilution. For analysis the material was dried at 78° C. and $10^{-4}$ mm. for one hour. It showed: C, 82.94; H, 6.15. Calculated for the product: C, 82.56; H, 6.11.

*Example 6*

A solution of 190 mg. of naphthazarin and 133 mg. of 1,1-bis-(p-dimethylaminophenyl)-ethylene in 15 ml. of benzene was brought to boiling, then heated for 24 hours at 74° C. in the dark. The resulting deep red-purple solution was concentrated somewhat and set aside to crystallize. The crude material which separated was collected and recrystallized from benzene to give 54 mg. of black needles, melting point 303°–305° C. (uncorrected). Recrystallization from hot benzene (deep blue-purple solution) gave 37 mg. of beautiful black needles with a faint deep green surface reflex, melting point 306°–308° C. (uncorrected). Its solution in concentrated sulfuric acid is a beautiful intense deep purple color. It dissolves in 3 N hydrochloric acid with a deep crimson color, and on strong dilution separates out as a blue-black solid. A small amount suspended in alcohol (very sparingly soluble) gives a deep cornflower blue color on treatment with a drop of dilute alkali. The cornflower blue alkali salt thus formed is rather insoluble in water, but has some solubility in alcoholic solutions. The color produced is very similar to that produced when naphthazarin itself is treated with alkali. The condensation product of naphthazarin with 1,1-bis-(p-dimethylaminophenyl)-ethylene was dried at 78° C. and $10^{-4}$ mm. for one hour. It showed: C, 74.27; H, 5.40. Calculated: C, 73.99; H, 5.77. This product has the formula:

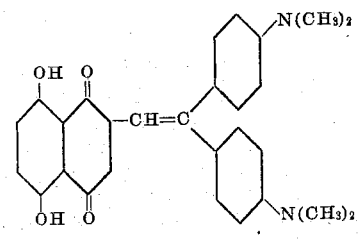

*Example 7*

A solution of 402 mg. of naphthazarin diacetate in 8 ml. of hot dioxane was treated with 192 mg. of 1,1-bis-(p-dimethylaminophenyl)-ethylene in 2 ml. of dioxane and heated to 78° C. for 90 hours protected from light. The reaction mixture became brown immediately, then gradually darkened to purple-red. Some very small well-formed colorless prisms separated along with some dark purple-red solid. The mixture of solids was filtered off (air dried, 286 mg.) and recrystallized once from dioxane and once from ethyl alcohol to give 133 mg. of colorless prismatic plates of 5,8-diacetoxyl-1,4-naphthohydroquinone, melting point 249°–250° C. The filtrate was diluted with water and the blue-black solid which precipitated was filtered off. In contrast to the other condensation products described, this material was not easily obtained in crystalline form. From its strongly concentrated dioxane solution only amorphous material separated (38 mg., melting point 253°–257° C.). Very slow recrystallization of this material yielded amorphous material along with some needles. A further crystallization gave 60 mg. of blue-black amorphous material, melting point 261°–264° C. It is very sparingly soluble in alcohol, soluble in acetone, dioxane or benzene. Its solution in sulfuric acid is a beautiful deep purple color. It dissolves in 3 N hydrochloric acid to give a bright yellow solution which acquires a greenish tinge on dilution but fails to precipitate. For analysis this condensation product of the naphthazarin diacetate with 1,1-bis-(p-dimethylaminophenyl)-ethylene, which has the probable formula:

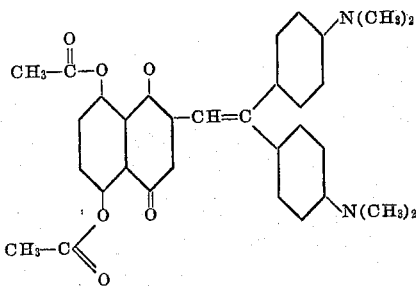

was dried at 78° C. and $10^{-4}$ mm. for two hours. It showed: C, 71.25; H, 5.23. Calculated: C, 71.36; H, 5.61.

The product is readily hydrolyzed to the parent naphthazarin derivative.

A solution of 42 mg. of crude condensation product (melting point 250°–255° C.) in 3 ml. of dilute hydrochloric acid was heated to boiling for five minutes. As the solution was heated, the color changed from yellow-green to deep crimson. The hydrolytic mixture was diluted with water, neutralized with solid sodium bicarbonate, the precipitated blue-black solid was taken into benzene, filtered, concentrated and set aside to crystallize. Beautiful black needles of Example 6 (20 mg.), melting point 307°–308° C. (uncorrected) were obtained.

Example 8

A solution of 500 mg. of alpha-naphthoquinone and 38 mg. of 1,1-dianisylethylene in 10 ml. of methanol was refluxed for 6 days, when a small amount of the ethylene remained undissolved. After a day, the mixture had turned a dirty gray-green color and small amounts of bright orange fluffy solid could be discerned. At the end of the refluxing period the reaction mixture was filtered hot, the insoluble material washed thoroughly with hot methanol, then taken into hot benzene. After filtration to remove a small amount of dark green-brown material insoluble in benzene, the filtrate was diluted with hot methanol and allowed to crystallize. Fluffy balls of very fine orange needles separated, 139 mg. (35% based on ethylene utilized), melting point 209°–210° C. A second crop of 18 mg., melting point 208°–210° C. was obtained from the filtrate; total yield, 39.4%. Two further crystallizations from benzene-methanol gave 105 mg. of fluffy balls of very fine orange needles, melting point 211.8°–212.3° C. The 2-(1',4'-naphthoquinonyl-2')-1,1-dianisylethylene is very sparingly soluble in methanol, readily soluble in hot benzene. Its solution in concentrated sulfuric acid is a deep blue to blue-green color. It is not soluble in dilute acids. The sample when dried at 78° C. and $10^{-5}$ mm. for two hours for analysis showed: C, 78.85; H, 4.75; OCH$_3$, 15.59. Calculated: C, 78.77; H, 5.09; 2OCH$_3$, 15.66. It has the formula:

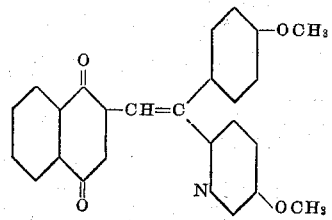

Example 9

To 2.69 g. of the addition product of quinaldine and dimethyl sulfate in a small amount of water in a separatory funnel, was added 60 ml. of 2-normal sodium hydroxide. The precipitated amorphous yellow material was immediately taken into 15 ml. of benzene, the aqueous layer drawn off, washed with 10 ml. of benzene, and the combined benzene extracts filtered at once through anhydrous magnesium sulfate through a filter paper. To this benzene solution was added all at once a solution of 3.16 g. of alpha-naphthoquinone in about 20 ml. of warm benzene. An immediate intense blue-green color was produced, and a thick sludge of dark violet or purple-black solid material separated rapidly. After standing for one and one-half hours, this precipitate was collected and washed well with benzene. The product, which has the formula:

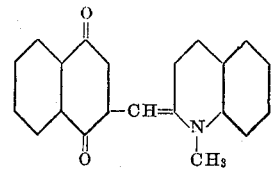

as obtained in this way, contains some alpha-naphthohydroquinone which may be separated out with solvents. It is soluble in dioxane to give a brilliant deep cornflower blue solution. Prolonged boiling of this solution produces a color change from cornflower blue to deep emerald green.

I claim:

1. The process for preparing 2-(1',4'-naphthoquinonyl-2')-1,1-bis-(p-dimethylaminophenyl)-ethylene which comprises heating together in an inert solvent alpha-naphthoquinone and 1,1-bis-(p-dimethylaminophenyl)-ethylene until condensation is effected, the alpha-naphthoquinone being employed in an excess of that required to condense with the ethylene compound.

2. The compound:

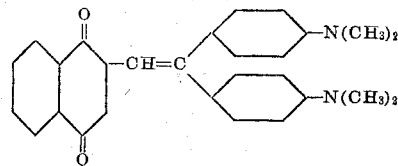

MARSHALL DE MOTTE GATES, Jr.